(12) United States Patent
Ge et al.

(10) Patent No.: US 8,411,577 B2
(45) Date of Patent: Apr. 2, 2013

(54) METHODS, APPARATUS AND ARTICLES OF MANUFACTURE TO PERFORM ROOT CAUSE ANALYSIS FOR NETWORK EVENTS

(75) Inventors: Zihui Ge, Secaucus, NJ (US); Dan Pei, Jersey City, NJ (US); Jennifer Yates, Morristown, NJ (US); He Yan, Fort Collins, CO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 334 days.

(21) Appl. No.: 12/728,002

(22) Filed: Mar. 19, 2010

(65) Prior Publication Data
US 2011/0231704 A1 Sep. 22, 2011

(51) Int. Cl.
*H04L 12/26* (2006.01)
(52) U.S. Cl. .................... 370/242; 370/216
(58) Field of Classification Search .......... 714/2, 4.1; 370/242, 216–228, 252, 253
See application file for complete search history.

(56) References Cited

U.S. PATENT DOCUMENTS

| | | | |
|---|---|---|---|
| 6,708,033 B1 | 3/2004 | Linkola et al. | |
| 6,778,525 B1 | 8/2004 | Baum et al. | |
| 7,676,775 B2 * | 3/2010 | Chen et al. | 716/136 |
| 2005/0278431 A1 * | 12/2005 | Goldschmidt et al. | 709/207 |
| 2009/0024356 A1 * | 1/2009 | Platt et al. | 702/181 |
| 2009/0183031 A1 * | 7/2009 | Bethke et al. | 714/38 |
| 2009/0262650 A1 * | 10/2009 | Shaikh et al. | 370/242 |
| 2009/0292521 A1 * | 11/2009 | Zhdankin | 703/21 |
| 2009/0292948 A1 * | 11/2009 | Cinato et al. | 714/26 |
| 2009/0327195 A1 * | 12/2009 | Iscen | 706/47 |
| 2010/0023604 A1 * | 1/2010 | Verma et al. | 709/221 |
| 2010/0325493 A1 * | 12/2010 | Morimura et al. | 714/39 |
| 2011/0185299 A1 * | 7/2011 | Hinckley et al. | 715/769 |
| 2011/0231715 A1 * | 9/2011 | Kunii et al. | 714/57 |

OTHER PUBLICATIONS

Hutchinson, Ford P. "Securing FTP with TLS," Oct. 2005, Retrieved from http://www.ietf.org/rfc/rfc4271.txt, (26 pages).
"BGP Commands," Cisco los BGP command reference. Oct. 13, 1997, Retrieved from http://www.cisco.com/en/US/docs/ios/iproute/command/reference/irp bgp1.html#wp1013297, (184 pages).
Keynote systems, inc. web site. Dated Aug. 22, 2008, Retrieved from http://web.archive.org/web/20080822132708/http://www.keynote.com/index.html. (1 page).
Ciena. "Multiservice Optical Switching System: The Value of OTN," http://www.ciena.com/MESH, Nov. 2009 (3 pages).
Overview of Multilink PPP Bundle. "Configuring MLPPP Bundles, Chapter 22," Sep. 13, 2004, Retrieved from http://www.juniper.net/techpubs/software/erx/junose81/swconfig-link/html/mlppp-config2.html. (4 Pages).

(Continued)

*Primary Examiner* — Gary Mui
(74) *Attorney, Agent, or Firm* — Hanley, Flight & Zimmerman, LLC

(57) ABSTRACT

Example methods, apparatus and articles of manufacture to perform root cause analysis for network events are disclosed. An example method includes retrieving a symptom event instance from a normalized set of data sources based on a symptom event definition; generating a set of diagnostic events from the normalized set of data sources which potentially cause the symptom event instance, the diagnostic events being determined based on dependency rules; and analyzing the set of diagnostic events to select a root cause event based on root cause rules.

20 Claims, 12 Drawing Sheets

OTHER PUBLICATIONS

Overview of Naive Bayes classifier. website. Jan. 1, 2005, Retrieved from http://en.wikipedia.org/wiki/Naive_Bayes_classifier. (pp. 5).

Cisco. "SONET Automatic Protection Switching," Retrieved from http://www.cisco.com/en/US/tech/tk482/tk606/tsd_technology_support_sub-protocol_home.html. 1992-2001.

P Bahl et al., "Towards Highly Reliable Enterprise Network Services Via Interface of Multi-level Dependencies," In SIGCOMM '07: Proceedings of the 2007 conference on Applications, technologies, architectures, and protocols for computer communications, 2007 (12 Pages).

M. Chen, E. Kiciman, E. Fratkin, A. Fox, and E. Brewer. "Pinpoint: Problem determination in large, dynamic internet services." In Proceedings of the 2002 International Conference on Dependable Systems and Networks, 2002 (10 pages).

I. Cohen, M. Goldszmidt, T. Kelly, and J. Symons. "Correlating instrumentation data to system states: A building block for automated diagnosis and control." Usenix Association, OSDI, 2004 (14 pages).

I. Cohen, S. Zhang, M. Goldszmidt, J. Symons, T. Kelly, and A. Fox. "Capturing,indexing, clustering, and retrieving system history," In Proceedings of the twentieth ACM symposium on Operating systems principles, ACM New York, NY, USA, 2005 (14 pages).

I. Ilyas, V. Markl, P. Haas, P. Brown, and A. Aboulnaga. "CORDS: automatic discovery of correlations and soft functional dependencies." In Proceedings of the 2004 ACM SIGMOD international conference on Management of data, 2004 (12 pages).

S. Kandula, D. Katabi, and J. Vasseur. "Shrink: A tool for failure diagnosis in IP networks." In Proceedings of the 2005 ACM SIGCOMM workshop on Mining Network Data, 2005 (6 pages).

S. Kandula, R. Mahajan, P. Verkaik, S. Agarwal, J. Padhye, and P. Bahl. "Detailed Diagnosis in Enterprise Networks." In SIGCOMM '09: Proceedings of the 2009 Conference on Applications, Technologies, Architectures, and Protocols for Computer Communications, 2009 (12 pages).

R. Kompella, J. Yates, A. Greenberg, and A. Snoeren. "Detection and localization of network black holes." In IEEE INFOCOM 2007. 26th IEEE International Conference on Computer Communications, 2007 (9 pages).

R. R. Kompella, J. Yates, A. Greenberg, and A. C. Snoeren. "Ip fault localization via risk modeling." In NSDI'05: Proceedings of the 2nd conference on Symposium on Networked Systems Design & Implementation, 2005 (15 pages).

F. Le, S. Lee, T. Wong, H. Kim, D. Newcomb, F. Le, S. Lee, T. Wong, H. Kim, and D. Newcomb. "Minerals: Using Data Mining to Detect Router." In ACM Sigcomm Workshop on Mining Data (MineNet), 2006 (6 pages).

A. Mahimkar, J. Yates, Y. Zhang, A. Shaikh, J. Wang, Z Ge, and C. Ee, "Troubleshooting chronic conditions in large IP networks." In Proceedings of the 2008 ACM CoNEXT Conference, 2008 (12 pages).

A. A. Mahimkar, Z. Ge, A. Shaikh, J. Wang, J. Yates, Y. Zhang, and Q. Zhao. "Towards automated performance diagnosis in a large iptv network." In SIGCOMM '09: Proceedings of the 2009 conference on Applications, technologies, architectures, and protocols for computer communications, 2009 (12 pages).

J. Moy. RFC2328: OSPF Version 2. 1998 (188 pages).

S. Papadimitriou, J. Sun, and C. Faloutsos. "Streaming Pattern Discovery in Multiple Time-Series." In Proceedings of the 31st international conference on Very large data bases, 2005 (12 pages).

M. Pathan, R. Buyya, and A. Vakali. Content Delivery Networks: State of the Art, Insights, and Imperatives. Content Delivery Networks, p. 1, 2008. (1 page).

I. Rish. "An empirical study of the naive Bayes classifier." In IJCAI 2001 Workshop on Empirical Methods in Artificial Intelligence, 2001 (6 pages).

I. Rish, M. Brodie, and S. Ma. "Efficient fault diagnosis using probing." in AAAI Spring Symposium on Information Refinement and Revision for Decision Making, 2002 (8 pages).

E. Rosen and Y. Rekhter. "Bgp/mpls ip virtual private networks (vpns)." RFC 4364, Feb. 2006 (45 pages).

A. Shaikh and A. Greenberg. OSPF monitoring: Architecture, design, and deployment experience. In Proc. USENIX/ACM NSDI, 2004 (14 pages).

J. Treinen and R. Thurimella. "A Framework for the Application of Association Rule Mining in Large Intrusion Detection Infrastructures." Lecture Notes in Computer Science, 4219:1, 2006 (18 pages).

L. Wang, M. Saranu, J. Gottlieb, and D. Pei. "Understanding BGP Session Failures in a Large ISP." in IEEE INFOCOM 2007. 26th IEEE International Conference on Computer Communications, 2007 (9 pages).

K. Yamanishi and Y. Maruyama. "Dynamic Syslog Mining for Network Failure Monitoring." In Proceedings of the eleventh ACM SIGKDD international conference on Knowledge discovery in data mining, 2005 (10 pages).

A. Yarali and A. Cherry. "Internet protocol television (IPTV)." TENCON 2005 2005 IEEE Region 10, 2005 (6 pages).

S. Zhang, I. Cohen, M. Goldszmidt, J. Symons, and A. Fox. "Ensembles of Models for Automated Diagnosis of System Performance Problems." In IEEE Conference on Dependable Systems and Networks (DSN), 2005 (15 pages).

A. Panagiotakis. "Dynamic Context Aware Service Provision in Beyond 3G Mobile Networks," National and Kapodistrian University of Athens Department of Informatis and Telecommunications, Oct. 2007 (19 pages).

* cited by examiner

METHODS, APPARATUS AND ARTICLES OF MANUFACTURE TO PERFORM ROOT CAUSE ANALYSIS FOR NETWORK EVENTS

TECHNICAL FIELD

The present disclosure pertains to network events and, more specifically to, methods, apparatus and articles of manufacture to perform root cause analysis for network events.

BACKGROUND

Internet Service Provider (ISP) networks may be complex having a number of hardware devices and/or software systems operating at different networking layers, which need to work seamlessly together to implement networking services. In order to ensure customer satisfaction, network operators work to quickly detect fault(s), network event(s) and/or performance problem(s), diagnose the root cause(s), and resolve the problem(s) in a timely fashion to reduce service impacts.

DETAILED DESCRIPTION

Figure 1:
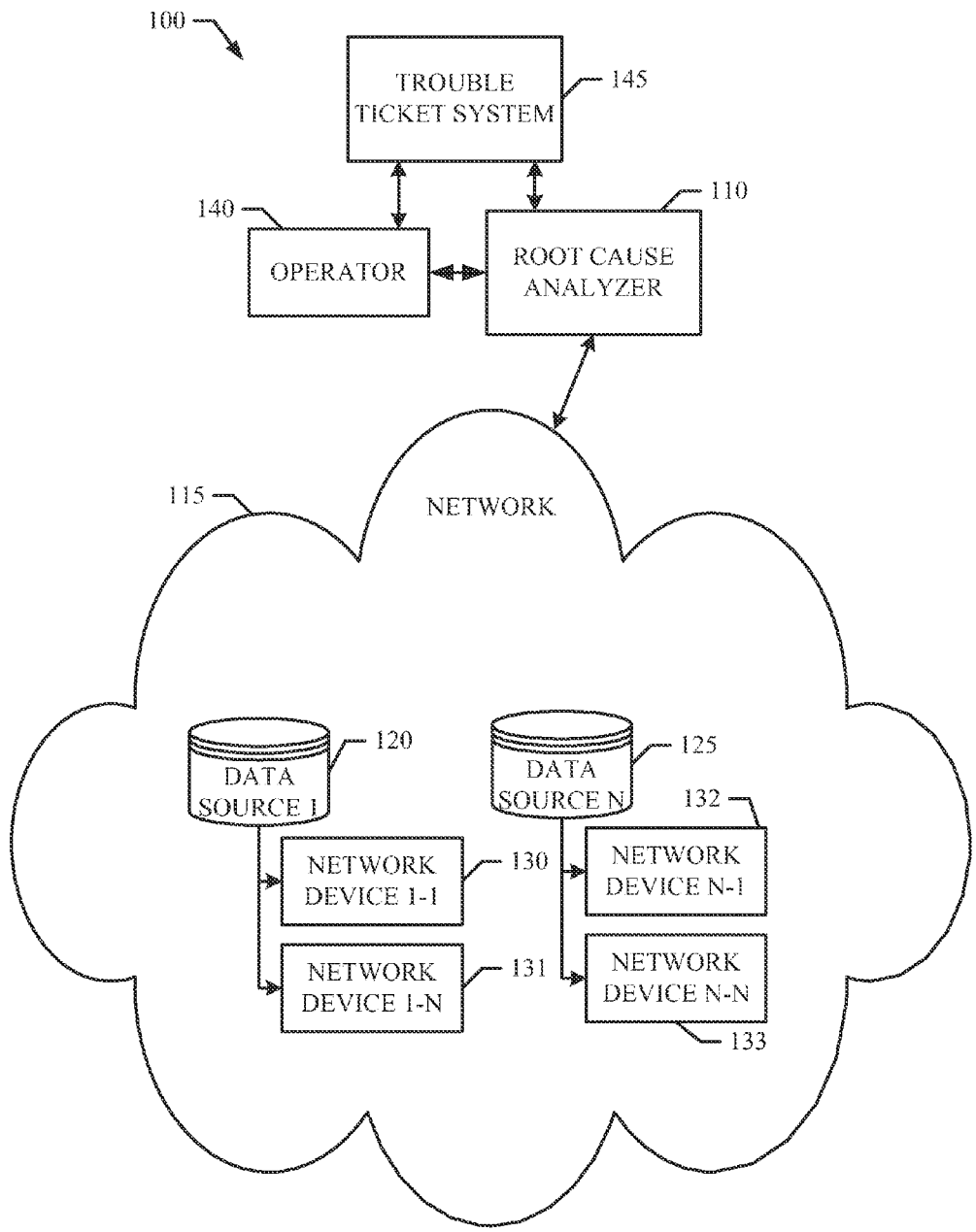
FIG. 1 is a block diagram of an example communication system having a root cause analyzer constructed in accordance with the teachings of this disclosure.

Example methods, apparatus and articles of manufacture to perform root cause analysis for network events are disclosed. A disclosed example method includes retrieving a symptom event instance from a normalized set of data sources based on a symptom event definition; generating a set of diagnostic events from the normalized set of data sources which potentially cause the symptom event instance, the diagnostic events being determined based on dependency rules; and analyzing the set of diagnostic events to select a root cause event based on root cause rules.

A disclosed example apparatus includes a data gatherer, to gather and normalize data related to network events; a join finder, to create a set of diagnostic network events joined to a symptom network event; and a root cause identifier, to identify a root cause event of the symptom network event based on the set of diagnostic network events.

Among the tasks that a network operator may perform during their day-to-day operations, root cause analysis may consume a significant percentage of their time. Moreover, the diverse numbers and types of fault(s), network event(s) and/or performance problems(s) that may occur in a large network may increase the complexity of identifying root causes. Two example scenarios in which root cause analysis may be applied are troubleshooting individual service-impacting network incidences, and long term investigations to continually improve network performance and/or reliability. Individual service-impacting network incidences include those currently present in the network, in which case network operators may be under great pressure to analyze a large number of alarm(s), log(s) and/or measurement(s) data to identify a root cause, and/or past network events to which a network operator seeks a better understanding of the root cause(s) to prevent it from reoccurring and/or to reduce its impact(s) in the future.

Example long-term investigations to improve overall network performance may include the analysis of critical faults and/or service interruptions, and/or the analysis of non-critical outages and/or undesirable conditions in the network. An example short duration event is a link flap that automatically clears itself. Example minor events include, but are not limited to, a router processor becoming temporarily overloaded, increasing the risk for protocol malfunction, and/or sporadic packet losses. However, short and/or minor incidences of service impairments may represent a chronic issue that may result in customer dissatisfaction. Hence, it is beneficial for network operators to keep track of such network events, to analyze and/or characterize their root cause(s), and to prioritize the correction of identified root cause(s). For example, if link congestion is determined as a primary root cause for reported and/or detected packet losses, capacity may need to be added to the network.

Network operators may manually investigate the root cause(s) of various network faults, network events and/or performance problems based on their knowledge and experience. However, gathering the relevant data together to manually investigate faults, events and/or performance problems may take hours. Such methods may be impractical for large networks and/or a large number of faults, events and/or performance problems. Despite the critical role that root cause analysis may have in networking operations, automated root cause analysis tools are not widely available. The existing tools that network operators rely on are either purpose built for a specific task (e.g., troubleshooting a line card failure), focusing on a specific domain (such as fault management), or completely depending on domain-knowledge input (i.e., lack of automated rule learning capabilities).

FIG. 1 is a block diagram of an example communication system 100 having an example root cause analyzer 110. To collect data, information and/or parameters representative of any number and/or type(s) of network event(s), network fault(s) and/or performance problem(s) for a network 115, the example communication system 100 of FIG. 1 includes any number and/or type(s) of data collectors and/or sources, two of which are designated at reference numerals 120 and 125. The example data sources 120 and 125 of FIG. 1 collect and/or store network event, network fault and/or performance data and/or information obtained and/or collected from any number and/or type(s) of network devices (four of which are designated at reference numerals 130-133) of the example network 115. In the illustrated example of FIG. 1, the data source 120 collects data and/or information from the example network devices 130 and 131 and the data source 125 collects data and/or information from the example network devices 132 and 133. Example data sources 120 and 125 are simple network management protocol (SNMP) servers, however, any number and/or type(s) of data sources may be implemented. In some examples, a data source 120, 125 may also implement a network device, and may report diagnostic information regarding its own operation, events, faults and/or performance. Example data, parameters and/or information that may be collected from the example data sources 120 and 125 and network devices 130-133 include, but are not limited to, router configuration information, layer 1 alarms, router logs, SNMP MIBs, and SNMP Traps, routing data, routing rules, router command logs, end to end measurements, etc.

To perform root cause analysis for the example network 115 of FIG. 1, the example communication system 100 of FIG. 1 includes the example root cause analyzer 110. The example root cause analyzer 110 of FIG. 1 analyzes the data, parameters and/or information collected by the example data sources 120 and 125 to determine and/or identify the root cause(s) of identified, detected and/or reported network events, network faults and/or performance problems. The example root cause analyzer 110 identifies the root cause(s) by implementing, applying and/or carrying out one or more rules that are defined, specified and/or provided by one or more network operator(s), network designer(s) and/or technician(s) 140 associated with the example network 115. The example operator 140 of FIG. 1 interfaces with the example root cause analyzer 110 via a user interface 220 (FIG. 2) to provide domain knowledge and/or to operate the example root cause analyzer 110. Initially, the operator 140 provides, specifies and/or defines an initial set of rules that the root cause analyzer 110 applies, implements and/or uses to identify root cause(s) of detected, reported and/or identified network events.

As used herein, a symptom event is any type of network event, network fault, performance problem, and/or network incident representing an observed, reported, identified and/or detected problem occurring in the network 115. An example symptom event represents an abnormally slow network connection reported by a user. A root cause event, as used herein, is a network event determined to be the root cause of one or more system events observed in the network 115. For example, the root cause event of an abnormally slow network connection may be the overloading of a particular network device (e.g., an edge device, a router, a switch, etc. . . . ). In some examples, the example root cause analyzer 110 statistically correlates symptom events and/or root cause events to update, create, form and/or generate new rules, models, and/or parameters which the operator 140 may accept, modify and/or reject via the example user interface 220.

The example root cause analyzer 110 of FIG. 1 reports identified root cause event(s) to the operator 140 via, for example, the example user interface 220. Upon notification of identified example root cause event(s), the operator 140 may initiate resolution of the identified root cause event(s) by, for example, generating and/or creating one or more trouble tickets in a trouble ticket system 145 to initiate resolution of the identified root cause event(s). Additionally or alternatively, the example root cause analyzer 110 may automatically create the trouble ticket(s) via an application programming interface (API) implemented by the example trouble ticket system 145.

While an example communication system 100 has been illustrated in FIG. 1, the elements illustrated in FIG. 1 may be combined, divided, re-arranged, eliminated and/or implemented in any way. Further, the example communication system 100 may include additional devices, databases, servers, systems, networks and/or processors in addition to, or instead of, those illustrated in FIG. 1, and/or may include more than one of any or all of the illustrated devices, databases, servers, networks, systems and/or processors.

Figure 2:
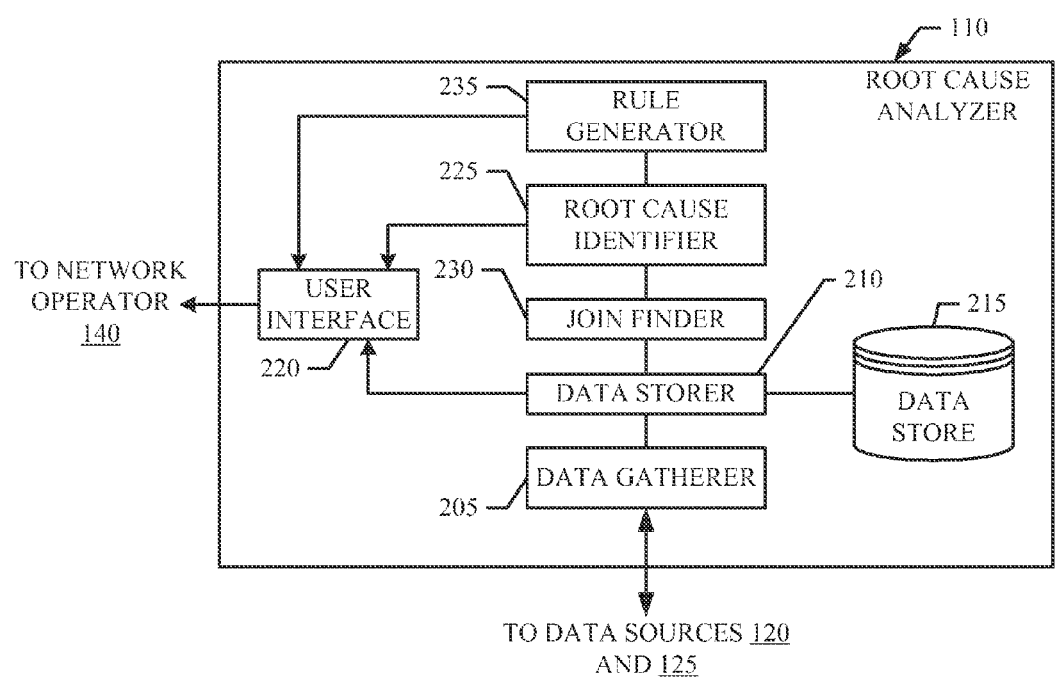
FIG. 2 illustrates an example manner of implementing the example root cause analyzer of FIG. 1.

FIG. 2 illustrates an example manner of implementing the example root cause analyzer 110 of FIG. 1. To collect, receive and/or otherwise obtain data and/or information from the data sources 120 and 125, the example root cause analyzer 110 of FIG. 1 includes a data gatherer 205. The example data gatherer 205 of FIG. 2 implements and/or utilizes any number and/or type(s) of protocol(s) and/or message(s) to interact with the example data sources 120 and 125 to obtain or collect the data and/or information. The data gatherer 205 may periodically and/or aperiodically request data and/or information from the example data sources 120 and/or 125, and/or may asynchronously receive data and/or information from the data sources 120 and 125. Because the data and/or information obtained from the example network devices 130-133 and/or the example data sources 120 and 125 may have different formats, the example data gatherer 205 normalizes and/or converts the collected data to use common representation(s), common naming convention(s) and/or common time zone(s) for ease of analysis.

To store data and/or information, the example root cause analyzer 110 of FIG. 2 includes a data storer 210 and a data store 215. The data and/or information collected by the example data gatherer 205 may be stored in the example data store 215 using any number and/or type(s) of data structures and/or data records, such as binary data, comma delimited data, tab delimited data, structured query language (SQL) structures, etc. The example data store 215 of FIG. 2 may be implemented using any number and/or type(s) of volatile and/or non-volatile memory(-ies), memory device(s) and/or storage device(s). For example, the data store 215 of FIG. 2 may be implemented using a distributed database. Example data and/or information that may be stored in the example data store 215 includes, but is not limited to, rules, log files of symptom events, and/or previously identified root cause events. Example event data structures that may be used to represent symptom events and/or root cause events are described below in conjunction with FIG. 3. Example data structures that may be used to represent rules or models are described below in conjunction with FIGS. 4-6, 9 and 10.

The example data storer 210 of FIG. 2 implements any number and/or type(s) of API(s) and/or data store interface(s) that enable other elements of the example root cause analyzer 110 (e.g., the example data gatherer 205, the user interface 220, and/or a root cause identifier 225) to query for, update, create, modify and/or delete data records and/or structures stored in the example data store 215.

To identify symptom events that may have a common root cause event, the example root cause analyzer 110 of FIG. 2 includes a join finder 230. The example join finder 230 of FIG. 2 obtains symptom event instances of interest from the example data store 215 via the example data storer 210, and joins and/or combines diagnostic data and/or information associated with the retrieved symptom events to create one or more symptom event instance graphs. Example operations of the example join finder 230 are described below in conjunction with FIGS. 3-6.

Based on one or more symptom event graphs generated by the example join finder 230, the example root cause identifier 225 of FIG. 2 identifies the root cause(s) of the currently considered symptom events. Example operations of the example root cause identifier 225 are described below in conjunction with FIGS. 7 and 8.

To correlate outputs of the example root cause identifier 225 with rules stored in the example data store 215, the example root cause analyzer 110 includes an rule generator 235. The example rule generator 235 of FIG. 2 statistically correlates the output of the root cause identifier 225 with other time series of events stored in the data store 215 to learn, adapt and/or incorporate previously unknown and/or learned knowledge of the network 115. In some circumstances, relationships between pairs of events might be obscured when other events in the network are also correlated with these two events. For symptom events not having identified root causes, the example rule generator 235 can perform statistical correlations with suspected or possible root cause events in identify and/or define new dependency rules.

The example user interface 220 of FIG. 2 implements any number and/or type(s) of graphical user interface(s) and/or APIs that enable the operator 140 and/or other network operation systems and/or servers to define, create, modify and/or delete rules in the data store 215, to initiate root cause analysis, to view and/or obtain the results of root cause analysis, and/or to view, query, modify and/or add symptom event data and/or information stored in the example data store 215.

While an example manner of implementing the example root cause analyzer 110 of FIG. 1 has been illustrated in FIG. 2, the interfaces, modules, elements and/or devices illustrated in FIG. 2 may be combined, divided, re-arranged, eliminated and/or implemented in any way. For example, the data gatherer 205, the data storer 210 and/or the data store 215 may be implemented separately from the root cause analyzer 110. Further, the example data gatherer 205, the example data storer 210, the example data store 215, the example user interface 220, the example root cause identifier 225, the example join finder 230, the example rule generator 235 and/or, more generally, the example root cause analyzer 110 of FIG. 2 may be implemented by hardware, software, firmware and/or any combination of hardware, software and/or firmware. Thus, for example, any of the example data gatherer 205, the example data storer 210, the example data store 215, the example user interface 220, the example root cause identifier 225, the example join finder 230, the example rule generator 235 and/or, more generally, the example root cause analyzer 110 may be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example data gatherer 205, the example data storer 210, the example data store 215, the example user interface 220, the example root cause identifier 225, the example join finder 230, the example rule generator 235 and/or, more generally, the example root cause analyzer 110 are hereby expressly defined to include a tangible medium such as a memory, a digital versatile disc (DVD), a compact disc (CD), etc. storing the software and/or firmware. Further still, the example root cause analyzer 110 may include additional interfaces, modules, elements and/or devices in addition to, or instead of, those illustrated in FIG. 2, and/or may include more than one of any or all of the illustrated interfaces, modules, elements and/or devices.

Figure 3:
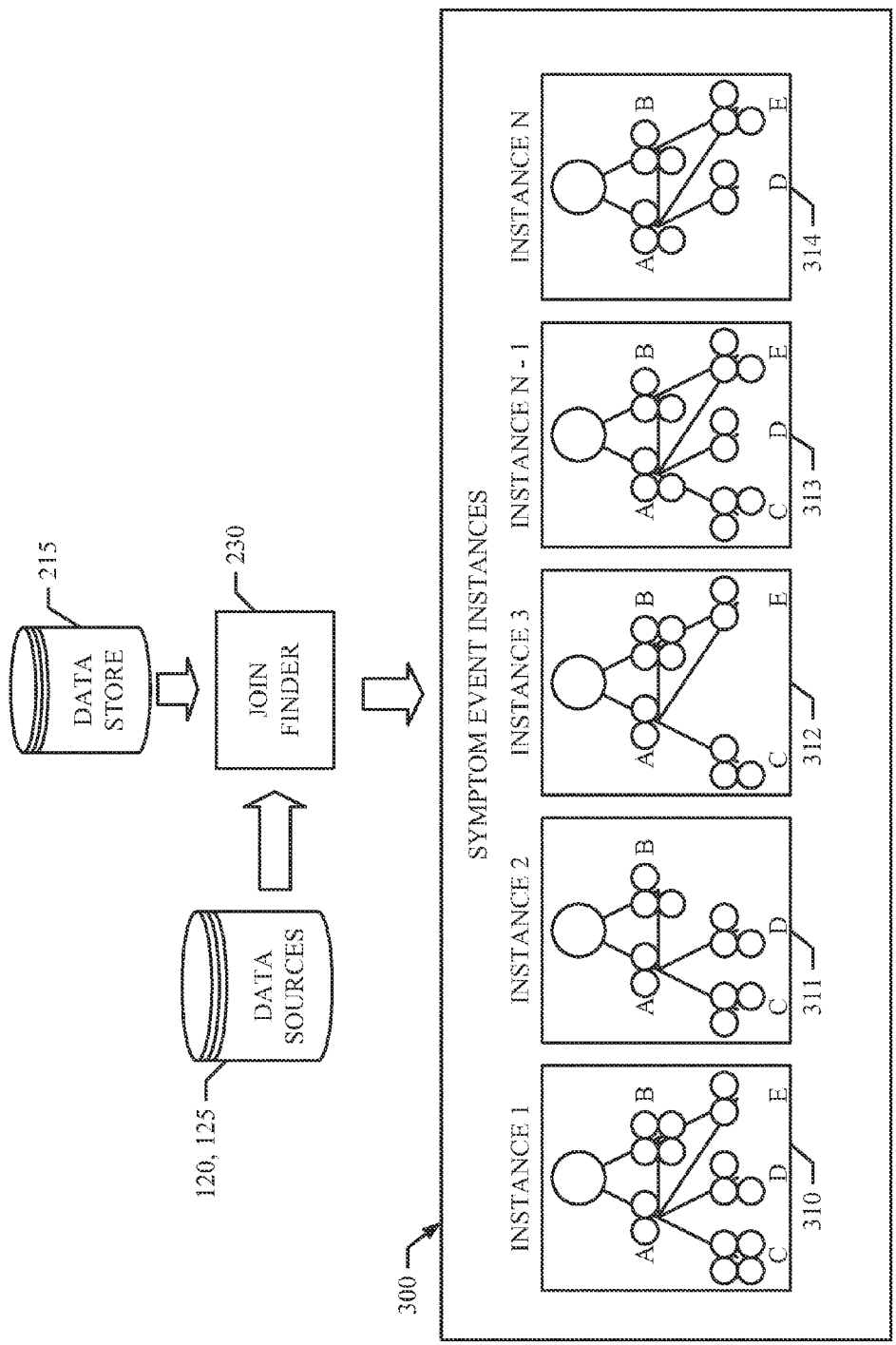
FIG. 3 illustrates example outputs of the example join finder of FIG. 2.

FIG. 3 illustrates example outputs 300 of the example join finder 230 of FIG. 2. Based on one or more inputs and/or selections provided to the example operator 140 (e.g., spatial parameters such as all access routers, and/or temporal parameters such as the past 3 months) via, for example, the user interface 220, the example join finder 230 identifies, retrieves and/or obtains all relevant symptom events from the data store 215 and/or the data sources 120, 125. The join finder 230 applies one more rules and/or models to the retrieved data and/or information to form, create and/or generate a symptom event instance graph 310-314 for each retrieved symptom event instance. In the illustrated example of FIG. 3, there are five retrieved symptom event instances for which five respective graphs 310-314 were generated by the example join finder 230. Each of the example symptom event instance graphs 310-314 of FIG. 3 includes the corresponding symptom event instance at the root of the graph 310-314 and potential root cause event instances are represented as leaf nodes to represent dependencies between the events. As shown in FIG. 3, each symptom event can be joined with multiple instances of a particular root cause event, and multiple symptom events can be joined with a single root cause event.

A symptom event definition represents the symptom or problem occurring in the network to be analyzed. An example symptom event definition is "end-to-end packet loss." Upon receiving the symptom event definition via the user interface 220, the example join finder 230 applies one or more dependency rules and/or models to generate the symptom event instance graphs 310-314.

Figure 4:
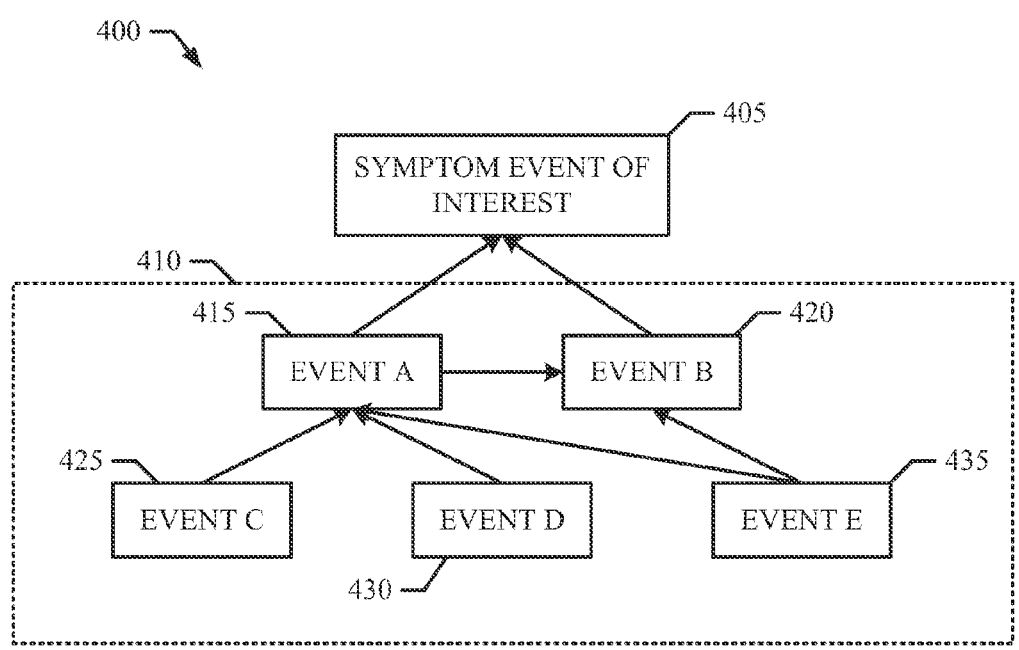
FIGS. 4-6 represent example models and/or rules that may be applied and/or implemented by the example join finders of FIGS. 2 and 3.

As shown in FIG. 4, the cause-effect relationship or dependency between a pair of events (e.g., a root cause event that may cause a symptom event) may be represented by edges of a graph with the events represented as respective nodes. For example, the root cause event "link-congestion" can cause the symptom event "end-to-end packet loss." As a further example, symptom event "link-congestion" can be caused by the root cause event "link failure." The example join finder 230 allows these events to be joined, combined and/or associated to each other based on dependency rules so that a more accurate analysis of the root cause can be performed. In other words, for each potential root cause event of a presently considered symptom event, a node and associated graph edge are added to the symptom event instance graph 310-314. As used herein, two events are joined when a symptom event instance graph includes an edge between the two events.

The example dependency rule 400 of FIG. 4 includes a symptom event of interest 405 and root cause events 410. The example root cause events 410 of FIG. 4 include an event A 415, an event B 420, an event C 425, an event D 430, and an event E 435. Knowledge of the causal relationships between pairs of the events is represented as edges of the graph or rule 400. The symptom event of interest 405 represents a problem occurring in the network for which the operator 140 is attempting to identify a root cause. As shown in FIG. 4, the symptom event of interest 405 may have dependencies to multiple root cause events. For example, the symptom event of interest 405 can be caused by the event A 415 and/or the event B 420, and the event A 410 can be caused by the event C 425, the event D 430 and/or the event E 435. While an example dependency rule 400 is shown in FIG. 4, a dependency rule may have any number and/or type(s) of events having any number and/or type(s) of relationships. Furthermore, each edge in the example dependency graph or rule 400 may have one or more temporal joining rules to indicate the temporal nature of the dependency(-ies), and/or may have one or more associated spatial joining rules to represent which events at which locations have causal relationships.

Spatial rules allow the operator 140 to define locations or types of locations at which an event may occur. The operator may use a spatial model to, for example, represent details such as dynamic routing information, Internet Protocol (IP)

topologies, router configurations, cross layer dependency and layer-1 connectivity information by only needing to specify a location type for each symptom-root cause event pair.

Figure 5:
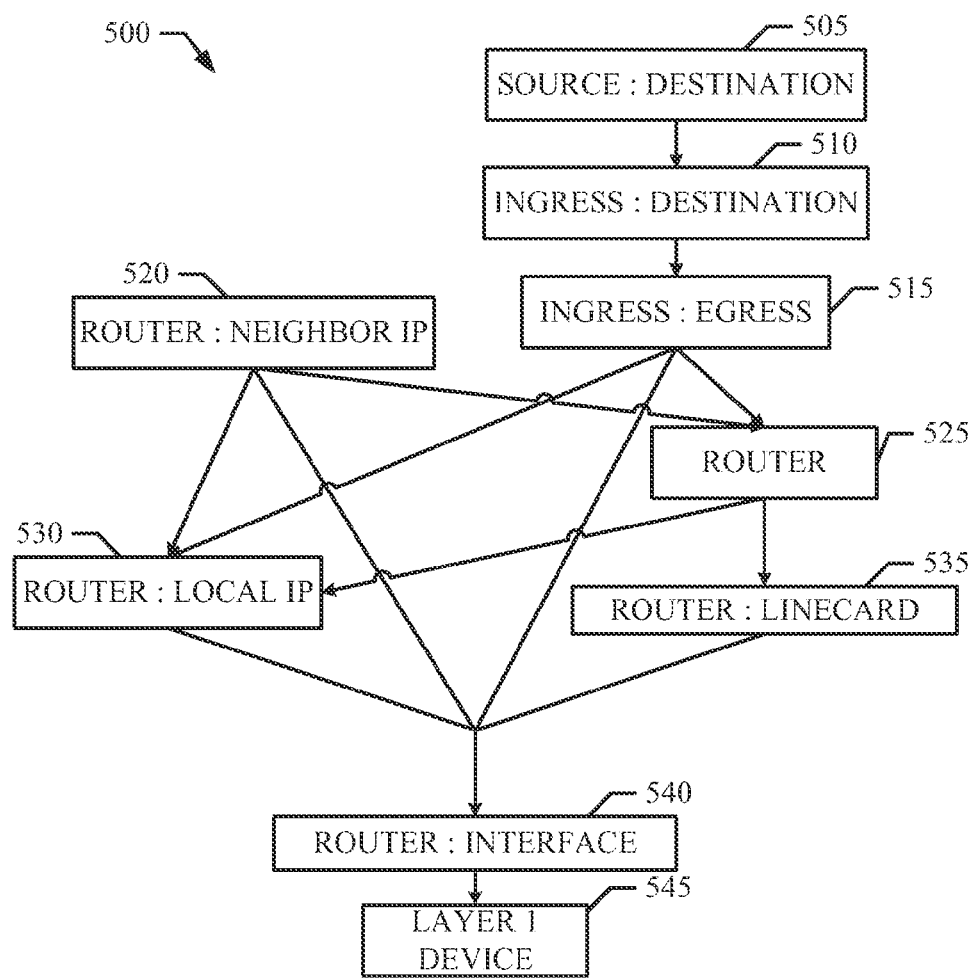

FIG. 5 illustrates an example spatial model and/or example spatial rules that may be applied and/or implemented by the example join finder 230. The example spatial model 500 of FIG. 5 defines common location types (where events happen) and mappings between them in the network 115. The example spatial model 500 contains location types for: Source:Destination 505, Ingress:Destination 510, Ingress:Egress 515, Router:NeighborIP 520, Router 525, Router:LocalIP 530, Router:Linecard 535, Router:Interface 540, and layer 1 device 545.

The join finder 230 automatically converts the locations of symptom events and root cause events into the same location type (join level) so that they can be directly compared. As shown in FIG. 3, joining based on the spatial model 500 might result in the joining of multiple locations, and two event instances are considered "joined" when their locations at a join level overlap. Join level is an optional parameter, which is by default the same as the location type of root cause event.

In an example scenario, the symptom event definition is an end-to-end packet loss event that has a location type of the example Source:Destination 505. The root cause event is a internal router backplane event that has a location type of the Router 525. The joining level can be "Backbone Router-level Path," which means only internal router backplane events in a router along the backbone path (not all the routers on the backbone) will be joined with this end-to-end packet loss event.

Figure 6:
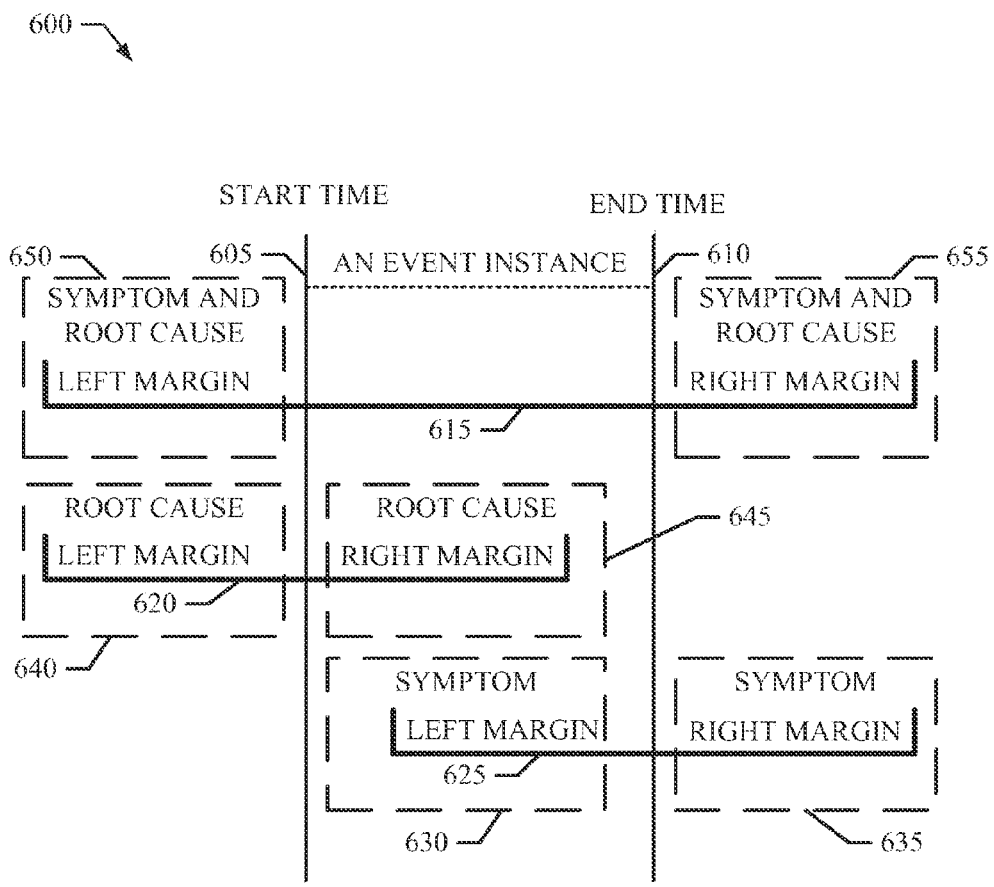

Temporal joining rules specify under what conditions a root cause event instance is considered to be temporally joined with a symptom event instance. Temporal rules allow the operator to specify a time period of network events selected for root cause analysis. An example temporal rule 600 that may be implemented by the example join finder 230 is shown in FIG. 6. The temporal rule 600 of FIG. 6 contains a start time 605, an end time 610, a start-end expanding option 615, a start-start expanding option 620, and an end-end expanding option 625. The example temporal joining rule 600 includes six parameters: symptom event's left and right margins 630 and 635, respectively; root cause event's left and right margins 640 and 645, respectively; and two expanding options for symptom event and root cause event 650 and 655, respectively. These six parameters may be used by the operator 140 to represent temporal relationships between symptom event instances and root cause event instances such as the cause-effect delays and measurement artifacts.

The example join finder 230 expands the time period of symptom/root cause event instances with left/right margins based on the example expanding options shown in FIG. 6. If the two expanded periods overlap, the event instances are joined. An example temporal joining rule between events "external border gateway protocol (eBGP) flap" and "Interface flap" has symptom event left and right margins of 180 seconds and 5 seconds, respectively. The root cause event's left and right margins are both 5 seconds and both are start-start expanding options 620. Here, 180 seconds is used to model the cause-effect delay between "eBGP flap" and "Interface flap" as 180 seconds is the default setting of an example eBGP hold timer. In other words, the event "eBGP flap" is likely to occur 180 s after the event "Interface flap" occurs. The 5 seconds margins are used to model the inaccurate time-stamps in syslog messages. Both expanding options are start-start expanding options 620 because when an eBGP session goes down, the start time of "eBGP flap" is only related to when interface goes down.

Figure 7:
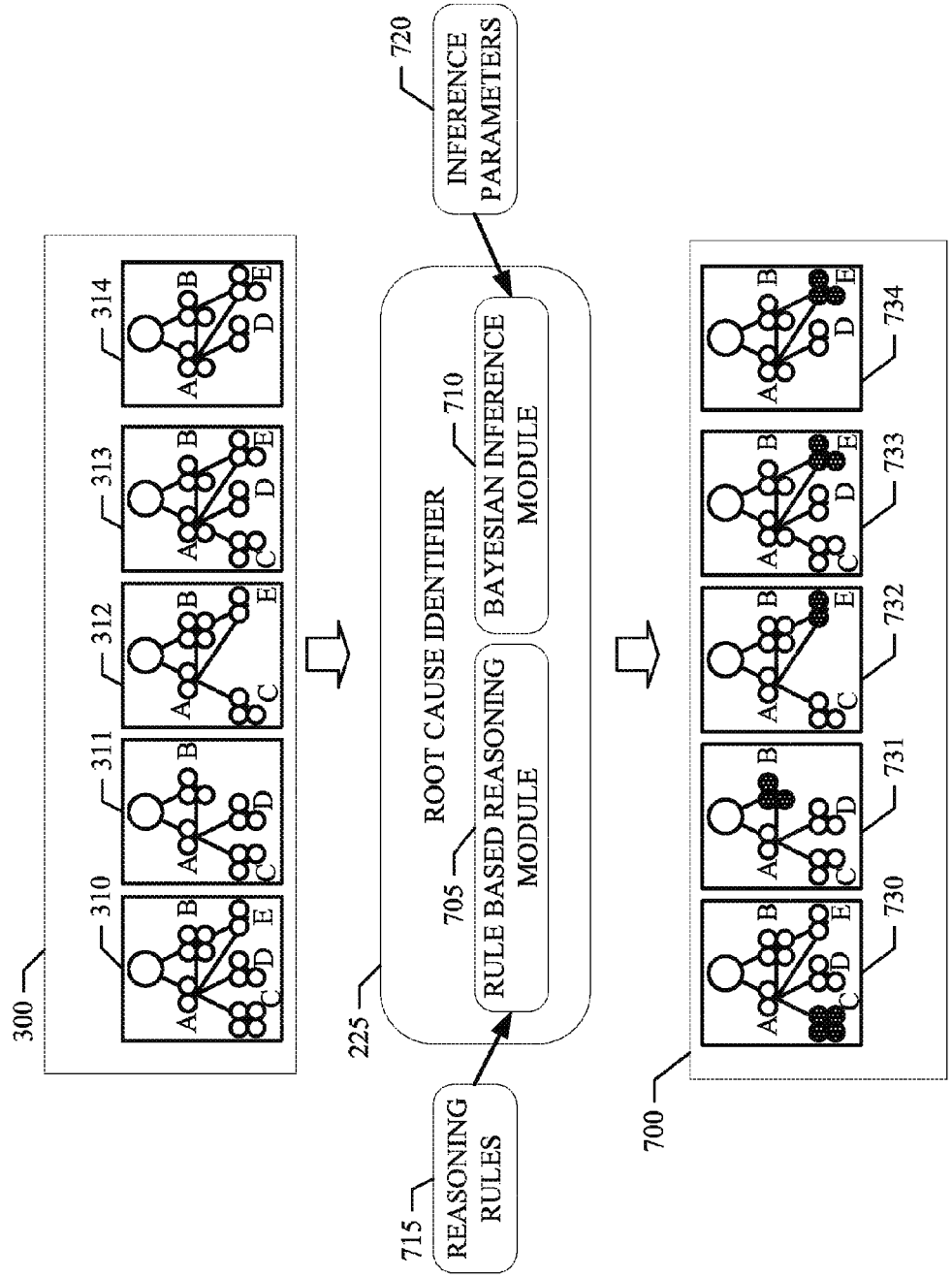
FIG. 7 illustrates example inputs and outputs of the example root cause identifier of FIG. 2.

FIG. 7 illustrates example outputs 700 of the example root cause identifier 225 of the root cause analyzer 110 of FIG. 2. Inputs of the example root cause identifier 225 are the example symptom event instance graphs 300 described above in connection with FIGS. 3-6. To identify root causes based on the example graphs 300, the example root cause identifier 225 of FIG. 7 uses root cause rules via a variety of modules. The root cause identifier 225 includes a rule-based reasoning module 705 and a Bayesian inference module 710. The example rule-based reasoning module 705 of FIG. 7 applies one or more reasoning rules 715 (root cause rules) to identify the root cause event for each of the example graphs 300.

The example outputs 700 include identified symptom event instances 730-734. The example identified symptom event instances 730-734 are related to the symptom event instances 310-314, respectively. Further, the highlighted leaf nodes of the identified symptom event instances 730-734 represent the events that have been identified as the root cause.

Figure 8:
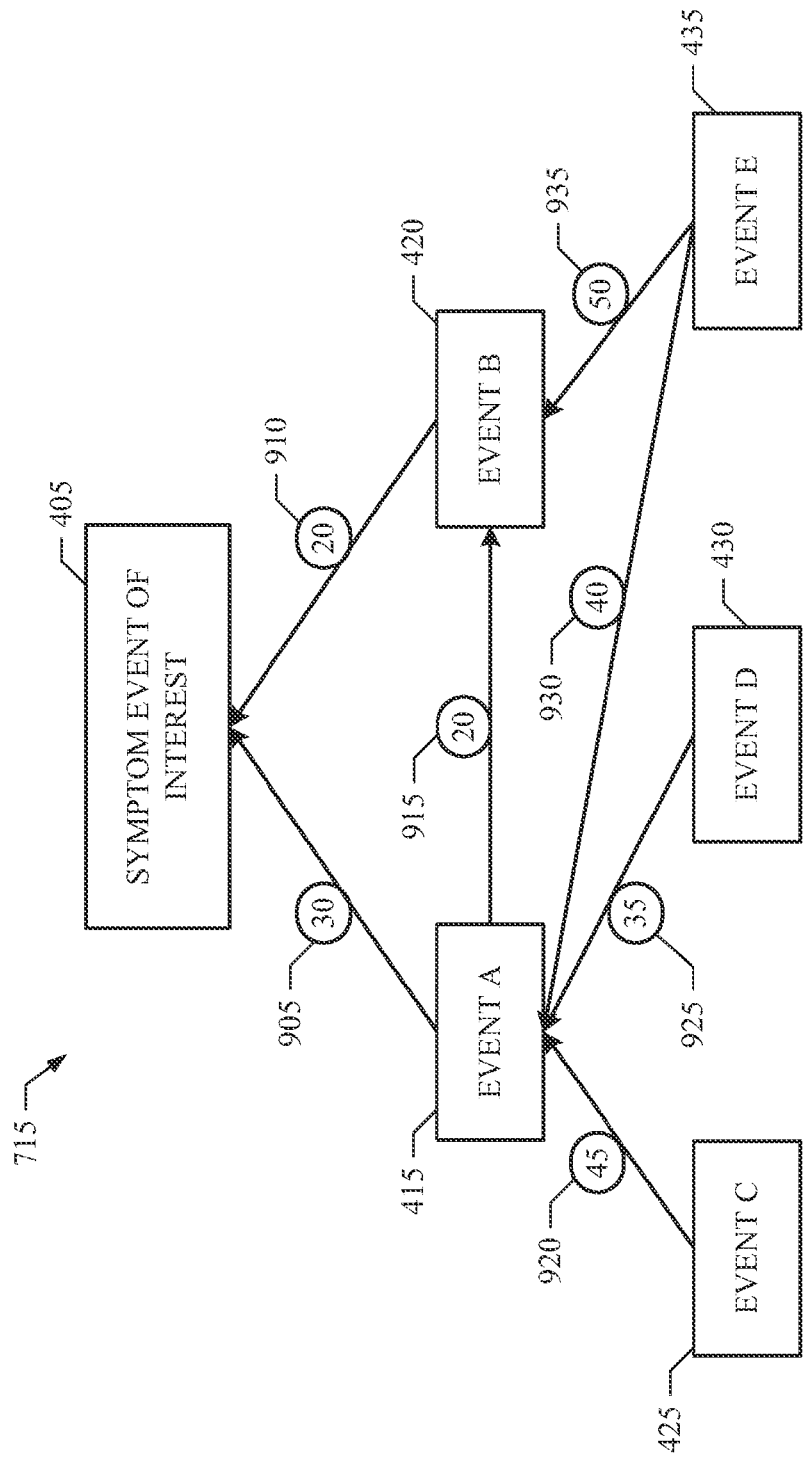
FIG. 8 is a diagram of example reasoning rules that may be implemented by the example root cause identifiers of FIGS. 2 and 8.

FIG. 8 illustrates an example reasoning rule 715 that may be applied by the example rule-based reasoning module 705 of FIG. 7. The structure of the example reasoning rule 715 of FIG. 8 is substantially similar to the example dependency rule 400 of FIG. 4. The example reasoning rule 715 contains the example symptom event of interest 405, the example root cause event A 415, the example root cause event B 420, the example root cause event C 425, the example root cause event D 430, and the example root cause event E 435. Additionally, the reasoning rule 715 contains priority values for each edge of the reasoning rule 715. For example, the event A to symptom event edge has a priority 905 of 30, and the event B to symptom event edge has a priority 910 of 20. The example operator 140 defines and/or specifics the priority values for each edge of the rule 715. The higher the priority value, the more likely the root cause event is the actual root cause of the symptom event of interest 405. When evaluating individual root symptoms, the rule-based reasoning module 710 compares the root cause events in the symptom event graph. The root cause event with the maximum priority configured is identified as the root cause event. In the case or a tie, both root cause events are selected as root causes.

For example, consider the example symptom event instance graph 310, which has 2 instances of event A, 4 instances of event B, 4 instances of event C, 3 instances of event D, and 2 instances of event E. In some examples, event E 435 is selected as the root cause of symptom event graph 310 because it has the highest priority of 50.

Additionally or alternatively, the priority of a particular root cause event may depend on the number of event instances associated with the root cause event node. Specifically, the priority of a root cause event node may be multiplied by the number of event instances associated with the root cause event node. For example, event C 425 for graph 310 has a priority of (45×4), which is greater than the priority of (50×2) associated with event E 435. Such methods may be used to bias the identified root cause towards root cause events with more supporting instances.

Further still, root cause events may be selected based on the sum of the priorities along the path from the root cause event to the symptom event of interest 405. For example, using this algorithm event C 425 instead of event E 435 is the root cause of the symptom event graph 310, because 30+45>20+50.

Moreover, the priorities can be variable or be selected depending on the attributes of event instances. For example, the priority of "CPU overload event" may vary according to the value of CPU utilization, which is an attribute of "CPU overload event" instances. For example, the root cause event of CPU utilization may be assigned a priority that increases as the CPU utilization increases.

While example reasoning rules were described above, any number and/or type(s) of additional and/or alternatively rules may be applied. Further, combinations of the rules described above may be applied using, for example, majority voting.

Returning to FIG. 7, in addition to or instead of the example rules-based reasoning module 705, the example Bayesian inference module 710 may be used to identify root causes. Using one or more inference parameters 720 (root cause rules), the example Bayesian inference module 710 determines the probability that a given root cause event is the actual root cause of a symptom event. The example Bayesian inference module 710 of FIG. 7 models unobservable root cause conditions (i.e., those that do not have strong observable evidence or signatures), and uncertainty of diagnostic evidences. Bayesian inference also allows multiple symptom event instances to be examined together and deduce a common root cause for them, which typically achieves better accuracy than when each individual symptom instance is diagnosed separately. In some examples, a Naïve Bayesian Classifier is used to model the root cause identification problem, in which the potential root causes are the classes, and the presence or absence of the diagnostic evidences as well as the symptom events themselves are the features. The likelihood for a particular root cause r given the features observed (e1, ..., en) is defined by the following mathematical expression $$p(r \mid e_1, \ldots, e_n) = \frac{p(r)p(e_1, \ldots, e_n \mid r)}{\sum_{r \in R} p(r)p(e_1, \ldots, e_n \mid r)}, \quad \text{EQN (1)}$$

where R is the set of potential root causes. The root cause may be identified by maximizing the maximum likelihood ratio $$\operatorname*{argmax}_{r \in R} \frac{p(r)}{p(\bar{r})} \times \frac{p(e_1, \ldots, e_n \mid r)}{p(e_1, \ldots, e_n \mid \bar{r})}, \quad \text{EQN (2)}$$

where $\bar{r}$ denotes when the root cause is not r.

Consider an example where the operator 140 assesses the likelihood ratio for a border gateway protocol (BGP) session flap due to overloaded router CPU. In this case, p(r) is the a priori probability of the overloaded router CPU inducing a BGP session timeout, and p(e1, . . . , en|r) is the probability of the presence of evidences (such as SNMP 5-minute average CPU measurement being high, or a BGP hold-timer expiry notification observed in router syslog) under such scenario; it is divided by p(e1, . . . , en|$\bar{r}$), which is the chance for the same evidences to appear when the BGP flap is due to other root causes. Hence, the first term in the EQN (1) quantifies how likely the root cause without any additional information is, and the second term quantifies how much confidence gained or lost from observing or not observing the set of evidences. When the features are conditionally independent, the second term can be decoupled to $$\prod_i \frac{p(e_i \mid r)}{p(e_i \mid \bar{r})},$$

in which each term quantifies the support of root cause r given evidence $e_i$. While the parameters $$\left(\text{ratios: } \frac{p(r)}{p(\bar{r})} \text{ and } \frac{p(e_i \mid r)}{p(e_i \mid \bar{r})}\right)$$

may be difficult to select and/or configure, they may be trained using historical data classified using, for example, the reasoning rules 705 of FIG. 7. Additionally or alternatively, fuzzy-logic values may be used. For example, the operator 140 can simply specify any number and/or type(s) of ratios, such as "Low", "Medium" and "High", having corresponding values of 2, 100, and 20000, respectively. These fuzzy-logic values are further described in conjunction with FIG. 9.

Figure 9:
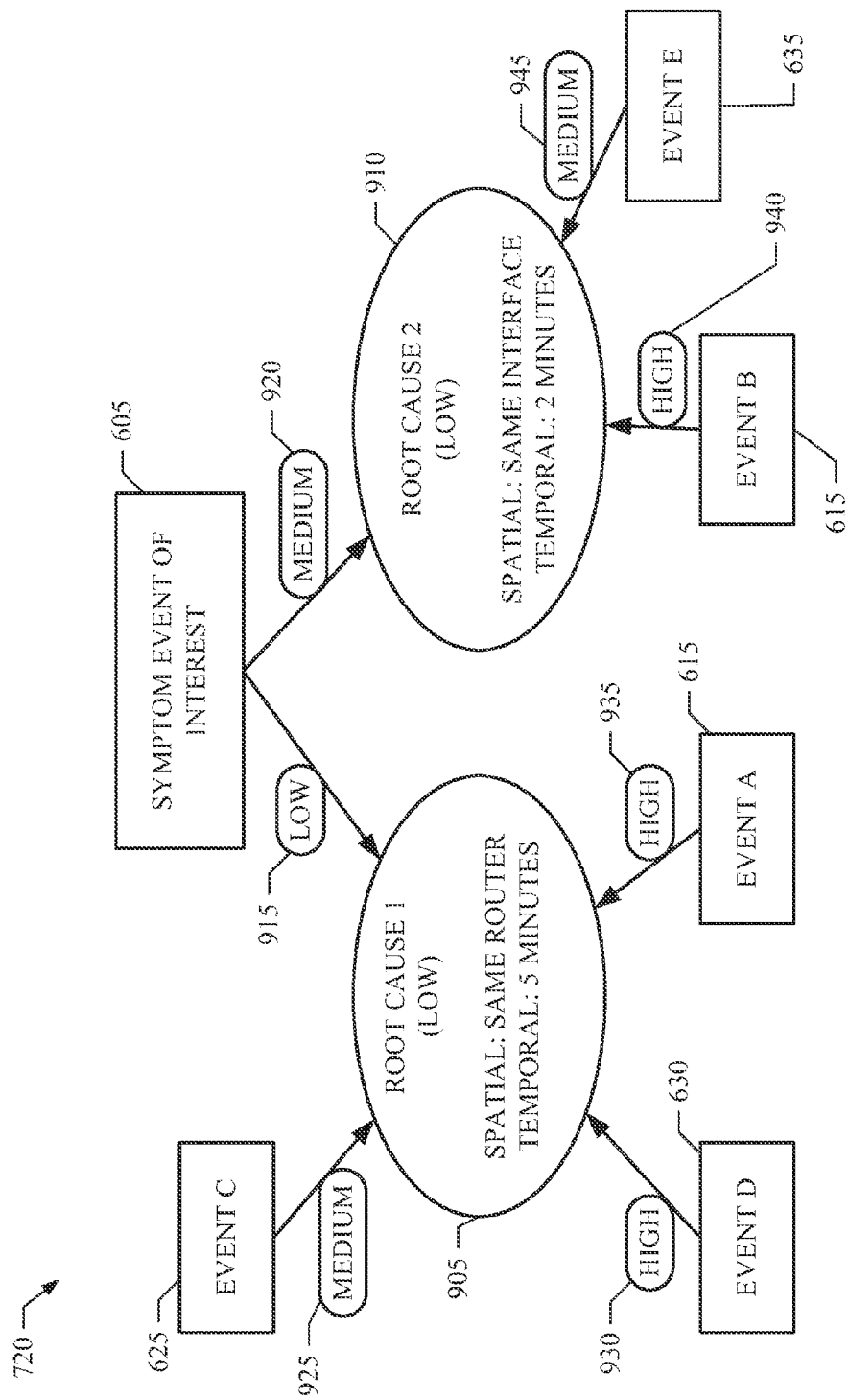
FIG. 9 is a diagram of example inference parameters that may be implemented by the example Bayesian inference module of FIG. 8.

FIG. 9 is a diagram of an example inference rule 720 that may be used and/or applied by the example Bayesian inference module 710 of FIG. 7. The example inference rule 720 of FIG. 9 includes the symptom event of interest 405, the event A 415, the event B 420, the event C 425, the event D 430, the event E 435, a root cause 1 (905), a root cause 2 (910), a fuzzy logic value for root cause 1 (915), a fuzzy logic value for root cause 2 (920), a fuzzy logic value for event C 925, a fuzzy logic value for event D 930, a fuzzy logic value for event A 935, a fuzzy logic value for event B 940, and a fuzzy logic value for event E 945.

Different diagnostic evidences may be indicative of different root causes. In the previous discussed BGP session flap example, one root cause can be "CPU overload at router x between time t1 to t2". The time and location information are extracted from the symptom event instances automatically. Moreover, a symptom event instance can itself be evidence to some root causes. For example, if many BGP sessions have timed-out about the same time on the same router, even when the corresponding SNMP 5-minute CPU average is unavailable (missing data), it may be used to determine that the common factor to these BGP sessions—the router CPU—is likely the root cause of the problem. In fact, missing CPU measurements can be due to router CPU being too busy to respond to an SNMP poll. It too can be model as a "Low" contributor to the CPU-overload virtual root cause event; the "Low" value is due to the high uncertainty, since missing SNMP measurements can be caused by an overloaded SNMP poller, and/or a loss of User Datagram Protocol (UDP) packets carrying the result. The Bayesian inference 710 module may be used to implement fuzzy reasoning logic.

While an example manner of implementing the example root cause identifier 225 of FIG. 2 has been illustrated in FIG. 7, the interfaces, modules, elements and/or devices illustrated in FIG. 7 may be combined, divided, re-arranged, eliminated and/or implemented in any way. Further, the example rule-based reasoning module 705, the example Bayesian inference module 710, the example reasoning rules 715, the example inference parameters 720 and/or, more generally, the example root cause identifier 225 of FIG. 7 may be implemented by hardware, software, firmware and/or any combination of hardware, software and/or firmware. Thus, for example, any of the example rule-based reasoning module 705, the example Bayesian inference module 710, the example reasoning rules 715, the example inference parameters 720 and/or, more generally, the example root cause identifier 225 may be implemented by one or more circuit(s), programmable processor(s), application specific integrated circuit(s) (ASIC (s)), programmable logic device(s) (PLD(s)) and/or field programmable logic device(s) (FPLD(s)), etc. When any of the appended apparatus claims are read to cover a purely software and/or firmware implementation, at least one of the example rule-based reasoning module 705, the example Bayesian inference module 710, the example reasoning rules 715, the example inference parameters 720 and/or, more generally, the example root cause identifier 225 are hereby expressly defined to include a tangible medium such as a memory, a digital versatile disc (DVD), a compact disc (CD), etc. storing the software and/or firmware. Further still, the example root cause identifier 225 may include additional interfaces, modules, elements and/or devices in addition to, or instead of, those illustrated in FIG. 7, and/or may include more than one of any or all of the illustrated interfaces, modules, elements and/or devices.

Figure 10:
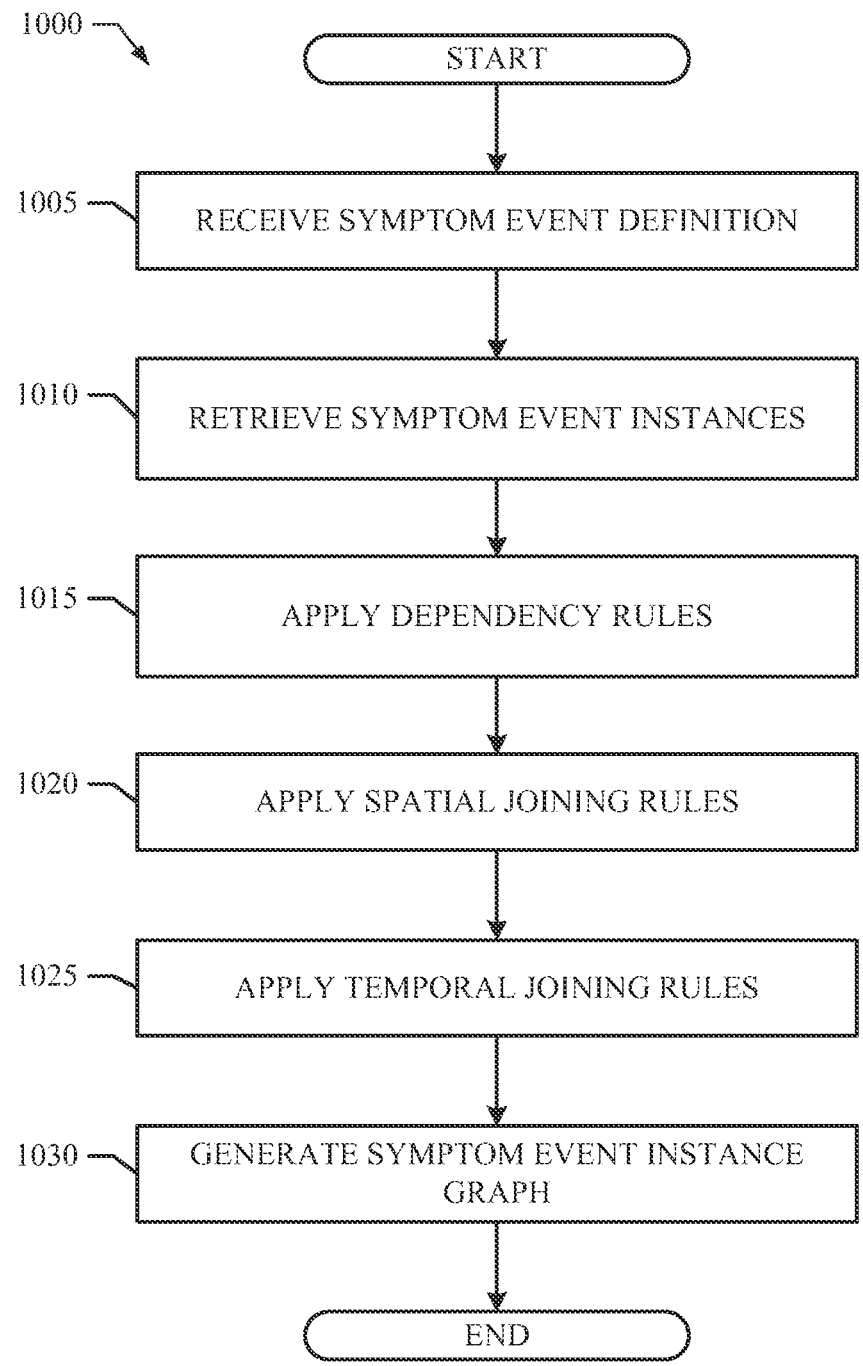
FIG. 10 is a flowchart representative of example machine readable instructions that may be executed to implement the example join finder of FIG. 2.
Figure 11:
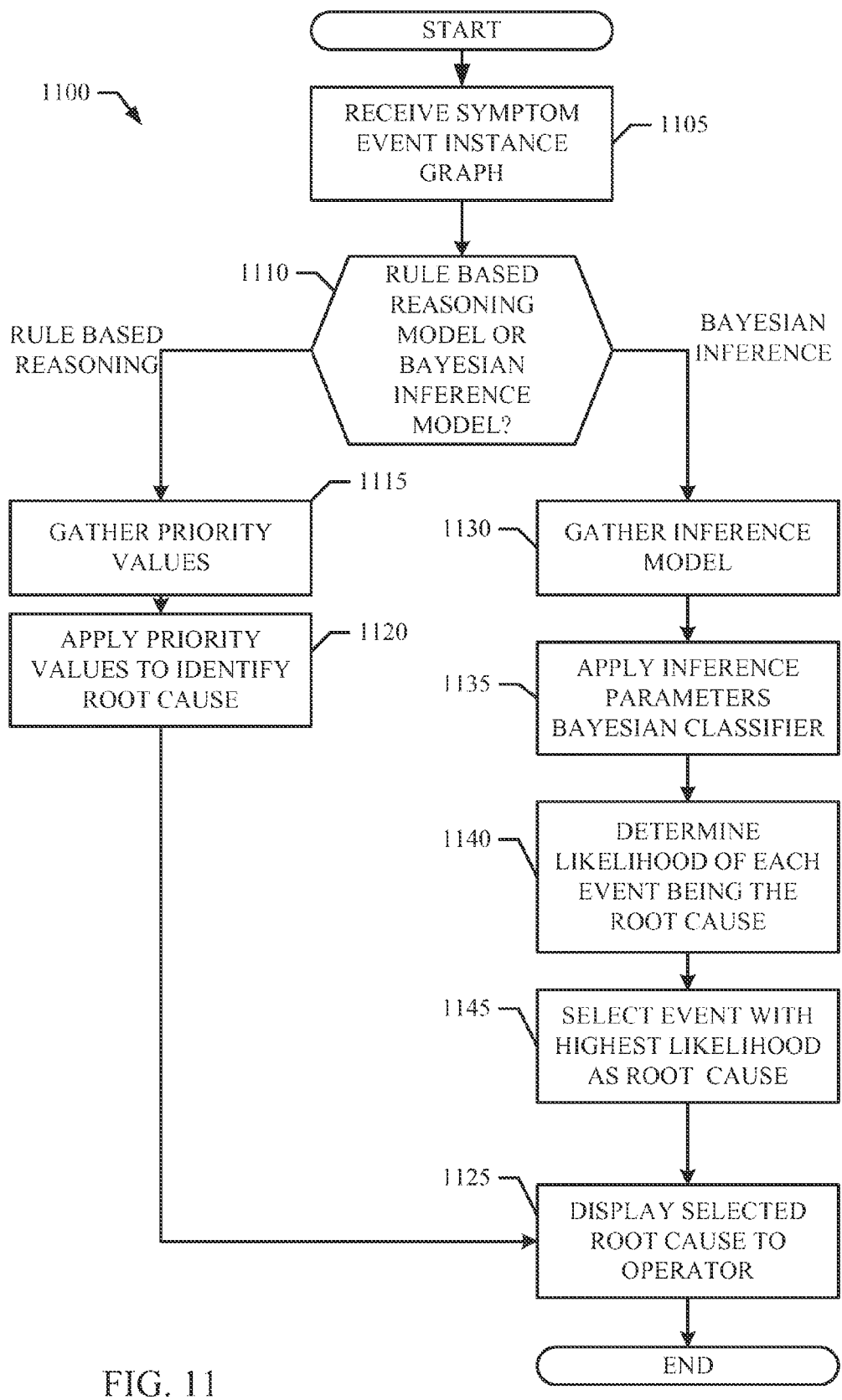
FIG. 11 is a flowchart representative of example machine readable instructions that may be executed to implement the example root cause identifiers of FIGS. 2 and 8.

FIG. 10 is a flowchart representative of example machine-accessible instructions 1000 that may be executed to implement the example join finder 230 of FIG. 2. FIG. 11 is a flowchart representative of example machine-accessible instructions 1100 that may be executed to implement the example root cause identifier 225 of FIGS. 1 and 2. The example machine-accessible instructions of FIGS. 10 and/or 11 may be carried out by a processor, a controller and/or any other suitable processing device. For example, the machine-accessible instructions of FIGS. 10 and/or 11 may be embodied in coded instructions stored on an article of manufacture, such as any tangible computer-readable media. Example tangible computer-readable media include, but are not limited to, a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other tangible medium which can be used to store program code and/or instructions in the form of machine-accessible instructions or data structures, and which can be electronically accessed by a processor, a general-purpose or special-purpose computer, or other machine with a processor (e.g., the example processor platform P100 discussed below in connection with FIG. 12). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 10 and/or 11 may be implemented using any combination(s) of ASIC(s), PLD(s), FPLD(s), discrete logic, hardware, firmware, etc. Also, some or all of the example processes of FIGS. 10 and/or 11 may instead be implemented manually or as any combination of any of the foregoing techniques, for example, any combination of firmware, software, discrete logic and/or hardware. Further, many other methods of implementing the example operations of FIGS. 10 and/or 11 may be employed. For example, the order of execution of the blocks may be changed, and/or one or more of the blocks described may be changed, eliminated, sub-divided, or combined. Additionally, any or all of the example machine-accessible instructions of FIGS. 10 and/or 11 may be carried out sequentially and/or carried out in parallel by, for example, separate processing threads, processors, devices, discrete logic, circuits, etc.

The example machine-accessible instructions 1000 of FIG. 10 begin when the operator 140 provides a symptom event definition to the example root cause analyzer 110 (block 1005). The operator 140 may provide the symptom event definition in response to network tools that are monitoring the network 115, and/or in response to a complaint received from a user. The join finder 230 retrieves symptom event instances from the remote data sources 120 and 125 via the data gatherer 205 (block 1010). The join finder 230 applies one or more dependency rules 400 to the collected data (block 1015), applies one or more spatial joining rules 500 (block 1020), and applies one or more temporal joining rules 600 (block 1025) to form the example symptom event instance graphs 300 (block 1030). Control then exits from the example machine-accessible instructions 1000 of FIG. 10.

The example machine-accessible instructions 1100 of FIG. 11 begins with the root cause identifier 225 receiving one or more symptom event instance graphs 300 from the example join finder 230 (block 1105). The root cause identifier 225 determines whether the example rule-based reasoning module 705 or the example Bayesian inference model 710 is to be used to identify the root cause event (block 1110.) The example operator 140 may select which model 705, 710 to use when defining the symptom event definition. However, the determination may be made based on any number of other factors. For example, certain event types (e.g., based on the symptom event definition) may be more accurately analyzed by a particular model 705, 710. In that case, the model 705, 710 most suited to identifying the root cause may be selected, to provide the most accurate results. If the rule-based reasoning model 705 is selected (block 1110), the rule-based reasoning module 705 gathers priority values from the data store 215 (block 1115.) The priority values are then applied and/or combined to the symptom event instance graph 300, for example, as described above in connection with FIG. 8, to identify the root cause (block 1120.) The identified root cause is then presented to the user (block 1125.)

Returning to block 1110, if Bayesian inference is selected (block 1110), the Bayesian inference module 710 gathers the Bayesian inference parameters 715 (block 1130) The Bayesian inference module 710 applies the inference parameters to the symptom event instance graph 300 (block 1135), and computes the likelihood of each event in the symptom event graph being the root cause (block 1140). The root cause identifier 225 selects the root cause event with the highest likelihood as the root cause (block 11145) and displays the identified root cause to the operator 140 (block 1125). Control then exits from the example machine-accessible instructions of FIG. 11.

Figure 12:
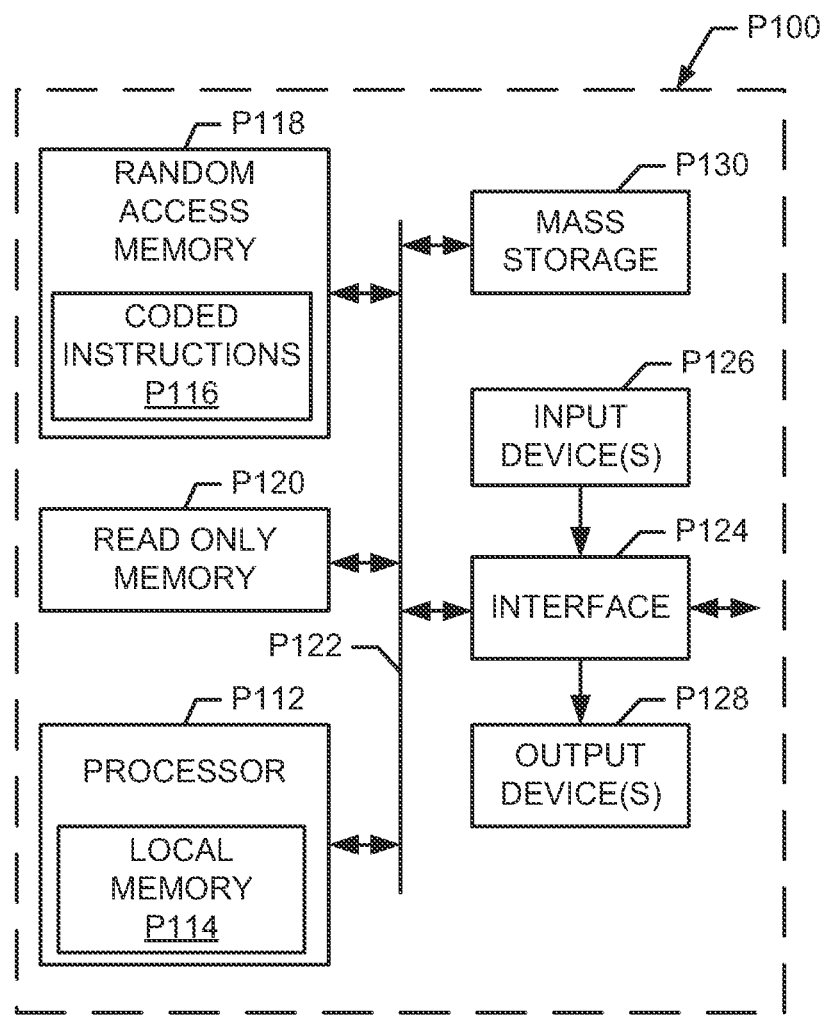
FIG. 12 is a block diagram of an example processor system that may execute, for example, the example machine readable instructions of FIGS. 10 and 11 to implement the example root cause analyzer of FIGS. 1 and 2.

FIG. 12 is a block diagram of an example processor platform P100 that may be used and/or programmed to implement the example root cause analyzers 110, the example root cause identifier 225 and/or the example join finder 230 of FIGS. 1, 2 and 7. The example processor platform P100 can be, for example, a server, a personal computer, a personal digital assistant (PDA), an Internet appliance, dedicated device, or any other type of computing device.

The system P100 of the instant example includes a processor P112 such as a general purpose programmable processor. The processor P112 includes a local memory P114, and executes coded instructions P116 present in the local memory P114 and/or in another memory device. The processor P112 may execute, among other things, the machine readable instructions represented in FIGS. 10 and 11. The processor P112 may be any type of processing unit, such as one or more microprocessors from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor P112 is in communication with a main memory including a volatile memory P118 and a non-volatile memory P120 via a bus P122. The volatile memory P118 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory P120 may be implemented by flash memory and/or any other desired type of memory device. Access to the main memory P118, P120 is typically controlled by a memory controller (not shown).

The processor platform P100 also includes an interface circuit P124. The interface circuit P124 may be implemented by any type of interface standard, such as an Ethernet interface, a universal serial bus (USB), and/or a third generation input/output (3GIO) interface.

One or more input devices P126 are connected to the interface circuit P124. The input device(s) P126 permit a user to enter data and commands into the processor P112. The input device(s) can be implemented by, for example, a keyboard, a mouse, a touchscreen, a track-pad, a trackball, an isopoint, and/or a voice recognition system.

One or more output devices P128 are also connected to the interface circuit P124. The output devices P128 can be implemented, for example, by display devices (e.g., a liquid crystal display, a cathode ray tube display (CRT)), by a printer and/or by speakers. The interface circuit P124, thus, may include a graphics driver card.

The interface circuit P124 also includes a communication device such as a modem or network interface card to facilitate exchange of data with external computers via a network (e.g., an Ethernet connection, a digital subscriber line (DSL), a telephone line, coaxial cable, a cellular telephone system, etc.). The example interface circuit P124 may be used to implement the example data gatherer 205 and/or the example user interface 220 of FIG. 2.

The processor platform P100 also includes one or more mass storage devices P130 for storing software and data. Examples of such mass storage devices P130 include floppy disk drives, hard drive disks, compact disk drives, and digital versatile disk (DVD) drives. The mass storage device P130 may implement the example data store 215. Alternatively, the volatile memory P118 may implement the example data store 215.

As an alternative to implementing the methods and/or apparatus described herein in a system such as the device of FIG. P1, the methods and or apparatus described herein may be embedded in a structure such as a processor and/or an ASIC (application specific integrated circuit).

Although the above discloses example systems including, among other components, software executed on hardware, it should be noted that such systems are merely illustrative and should not be considered as limiting. For example, it is contemplated that any or all of the disclosed hardware and software components could be embodied exclusively in dedicated hardware, exclusively in software, exclusively in firmware or in some combination of hardware, firmware and/or software.

In addition, although certain methods, apparatus, and articles of manufacture have been described herein, the scope of coverage of this patent is not limited thereto. On the contrary, this patent covers all apparatus, methods, and articles of manufacture fairly falling within the scope of the appended claims either literally or under the doctrine of equivalents.

What is claimed is:

1. A method of determining a root cause of a network problem, comprising:
   normalizing a set of events from data sources to form a normalized set;
   retrieving a symptom event instance from the normalized set based on a symptom event definition;
   generating a set of diagnostic events from the normalized set which potentially cause the symptom event instance, the diagnostic events being identified based on dependency rules, the dependency rules including a spatial model to identify diagnostic events which have locations related to the symptom event instance; and
   analyzing the set of diagnostic events to select a root cause event based on root cause rules.

2. The method of claim 1, wherein the root cause rules are reasoning rules.

3. The method of claim 2, wherein the reasoning rules define priorities of at least one of the diagnostic events being the root cause event of the symptom event.

4. The method of claim 1, wherein the root cause rules are Bayesian inference parameters.

5. The method of claim 4, wherein the Bayesian inference parameters define the likelihood of at least one of the diagnostic events being the root cause event of the symptom event.

6. The method of claim 1, additionally comprising:
   statistically correlating the root cause events and the symptom event to propose new dependency and root cause rules;
   updating the dependency rules with the proposed dependency rules; and
   updating the root cause rules with the proposed root cause rules.

7. The method of claim 6, additionally comprising validating the proposed dependency and root cause rules prior to updating the dependency and root cause rules, wherein validating the proposed dependency and root cause rules is performed by a network operator.

8. The method of claim 1, wherein retrieving the symptom event instance additionally comprises storing the normalized set in a database.

9. The method of claim 8, wherein the database comprises a distributed database.

10. The method of claim 1, wherein generating the set of diagnostic events from the set of normalized data sources further comprises comparing timestamps for events of the normalized set to determine if the events of the normalized set should be included in the set of diagnostic events.

11. An apparatus to determine a root cause of a network problem, comprising:
    a data gatherer to gather data related to network events and to normalize the network events to form a normalized set;
    a join finder to identify a set of diagnostic events joined to a symptom network event within the normalized set, the join finder using a spatial model to identify diagnostic events which have a physical location related to the symptom network event; and
    a root cause identifier to identify a root cause event of the symptom network event based on the set of diagnostic events.

12. The apparatus as defined in claim 11, wherein the set of diagnostic events is created as a symptom event graph.

13. The apparatus as defined in claim 12, wherein the symptom event graph comprises a central node identifying the symptom event, and at least one leaf node identifying a diagnostic event.

14. The apparatus as defined in claim 11, wherein the join finder is to determine which of the network events should be included in the set of diagnostic events by comparing the location of the network events.

15. The apparatus as defined in claim 11, wherein the join finder is to determine which of the network events should be included in the set of diagnostic events by comparing the timestamps of the network events.

16. A tangible computer readable medium storing instructions which when executed cause a machine to at least:
   normalize a set of events from data sources to form a normalized set;
   retrieve a symptom event instance from the normalized set based on a symptom event definition;
   generate a set of diagnostic events from the normalized set which potentially cause the symptom event instance, the diagnostic events being identified based on a spatial model to identify diagnostic events which have locations related to the symptom event instance and timestamps for events of the normalized set; and
   analyze the set of diagnostic events to select a root cause event based on root cause rules.

17. The tangible computer readable medium storing instructions described in claim 16, wherein the root cause rules are reasoning rules.

18. The tangible computer readable medium storing instructions described in claim 16, wherein the root cause rules are Bayesian inference parameters that define the likelihood of at least one of the diagnostic events being the root cause event of the symptom event.

19. The tangible computer readable medium storing instructions described in claim 16, wherein the instructions further cause the machine to at least:
   correlate the root cause events and the symptom event to propose new dependency and root cause rules;
   update the dependency rules with the proposed dependency rules; and
   update the root cause rules with the proposed root cause rules.

20. The tangible computer readable medium storing instructions described in claim 16, wherein the instructions cause the machine to store the normalized set in a database.

* * * * *